(12) United States Patent
Guerin et al.

(10) Patent No.: US 11,022,216 B2
(45) Date of Patent: Jun. 1, 2021

(54) CVT RATIO CONTROL WITH RESPECT TO THE ACTUAL ENGINE TORQUE OF THE PRIME MOVER

(71) Applicant: TRANSMISSION CVTCORP INC., Sainte-Julie (CA)

(72) Inventors: Jonathan Guerin, Sainte-Julie (CA); Jean-Francois Dionne, LaPrairie (CA)

(73) Assignee: TRANSMISSION CVTCORP INC., Sainte-Julie (CA)

( * ) Notice: Subject to any disclaimer, the term of this patent is extended or adjusted under 35 U.S.C. 154(b) by 128 days.

(21) Appl. No.: 16/462,635

(22) PCT Filed: Nov. 27, 2017

(86) PCT No.: PCT/CA2017/051422
§ 371 (c)(1),
(2) Date: May 21, 2019

(87) PCT Pub. No.: WO2018/098568
PCT Pub. Date: Jun. 7, 2018

(65) Prior Publication Data
US 2019/0277399 A1    Sep. 12, 2019

Related U.S. Application Data

(60) Provisional application No. 62/428,622, filed on Dec. 1, 2016.

(51) Int. Cl.
*F16H 61/04* (2006.01)
*F16H 61/66* (2006.01)
(Continued)

(52) U.S. Cl.
CPC ............. *F16H 61/66* (2013.01); *F16H 59/36* (2013.01); *F16H 59/68* (2013.01); *F16H 61/04* (2013.01);
(Continued)

(58) Field of Classification Search
CPC .......... F16H 61/66; F16H 59/36; F16H 61/04; F16H 59/68; F16H 61/66259;
(Continued)

(56) References Cited

U.S. PATENT DOCUMENTS 4,653,004 A   3/1987  Osanai et al.
4,658,360 A * 4/1987  Osanai .................. B60W 10/06
                                                474/18
(Continued)

FOREIGN PATENT DOCUMENTS

| CN | 104110475 | 10/2014 |
| CN | 104903622 | 9/2015 |
| CN | 104968958 | 10/2015 |
| CN | 106068200 | 11/2016 |
| EP | 0126869 | 12/1984 |

*Primary Examiner* — Justin Holmes
(74) *Attorney, Agent, or Firm* — Fay Kaplun & Marcin, LLP

(57) ABSTRACT

A drivetrain control and a method for controlling a drivetrain where the actual engine torque of the prime mover is taken into account are described herein. Illustrative embodiments include control systems and methods where the ratio set point of the CVT and/or the rate of the CVT ratio change are modified according to the actual engine torque of the prime mover.

28 Claims, 11 Drawing Sheets

(51) Int. Cl.
*F16H 59/36* (2006.01)
*F16H 59/68* (2006.01)
*F16H 61/662* (2006.01)
*F16H 59/14* (2006.01)
*F16H 59/44* (2006.01)
*F16H 59/70* (2006.01)

(52) U.S. Cl.
CPC ....... *F16H 61/66259* (2013.01); *F16H 59/14* (2013.01); *F16H 59/44* (2013.01); *F16H 2059/147* (2013.01); *F16H 2059/366* (2013.01); *F16H 2059/702* (2013.01); *F16H 2061/6604* (2013.01); *Y02T 10/40* (2013.01)

(58) Field of Classification Search
CPC .... F16H 2059/702; F16H 59/14; F16H 59/44; F16H 2059/147; F16H 2059/366; F16H 2061/6604; Y02T 10/40
See application file for complete search history.

(56) References Cited

U.S. PATENT DOCUMENTS

| | | |
|---|---|---|
| 4,665,773 A | 5/1987 | Hiramatsu et al. |
| 4,702,725 A | 10/1987 | Kouno et al. |
| 7,479,090 B2 | 1/2009 | Jacobs |
| 8,057,354 B2 | 11/2011 | Frank et al. |
| 8,428,834 B2 | 4/2013 | Takahashi et al. |
| 8,457,848 B2 | 6/2013 | Eastman et al. |
| 8,606,474 B2 | 12/2013 | Guo et al. |
| 9,365,203 B2 | 6/2016 | Keilers et al. |
| 2002/0062186 A1* | 5/2002 | Abiru ................ F16H 61/66254 701/51 |
| 2010/0174456 A1 | 7/2010 | Beaudoin et al. |
| 2013/0218429 A1* | 8/2013 | Ayabe ............... F16H 61/66259 701/61 |
| 2016/0252180 A1* | 9/2016 | Sato .................. F16H 61/66259 701/51 |

\* cited by examiner

CVT RATIO CONTROL WITH RESPECT TO THE ACTUAL ENGINE TORQUE OF THE PRIME MOVER

FIELD

The present disclosure generally relates to Continuously Variable Transmissions (CVTs). More specifically, the present disclosure is concerned with the control of the ratio of a CVT with respect to the actual engine torque of the prime mover.

BACKGROUND

CVTs are well known transmission mechanisms that can change trough an infinite number of gear ratios provided between upper and lower limits.

In a conventional vehicle drivetrain 10, as schematically illustrated in FIG. 1, a prime mover, often in the form of an internal combustion engine (ICE) 12, has an output shaft connected to the input shaft of a CVT 14. The output shaft of the CVT being connected to a final drive 16 driving the wheels 18. A controller 20 is connected to the ICE 12, the CVT 14 and the final drive 16 so as to control the overall operations of the drivetrain 10. A user input 22, which may be for example, an acceleration pedal, is connected to the controller 20.

The final drive 16 may include, for example, a discrete speed ratio selection mechanism, a forward-reverse selection mechanism and/or a differential.

A simple conventional method of operation of a drivetrain such as 10 is to increase the rotation speed (RPM) set point of the ICE 12 when the acceleration pedal 22 is depressed by the user and to increase the CVT ratio set point (from the underdrive towards the overdrive) when the RPM of the ICE 22 increases.

FIGS. 2 and 3 of the appended drawings respectively schematically illustrate the RPM set point of the ICE 12 with respect to the position of the acceleration pedal and the ratio of the CVT 14 with respect to the RPM of the ICE for a conventional drivetrain such as 10.

Accordingly, when the acceleration pedal is depressed, the ICE RPM set point is increased, thereby increasing the actual RPM of the ICE, when possible. The ratio set point of the CVT is also increased since the actual RPM increases. Conventionally, the CVT ratio is brought to the new set point at a predetermined and generally constant speed.

One skilled in the art will be in a position to understand that the graphs of FIGS. 2 and 3 are schematic. It is also to be noted that other factors may influence the ICE RPM set point beyond the acceleration pedal position. For example, should the ICE be so controlled as to be highly energy efficient, the controller could affect another set point to the ICE.

Many of the ICE currently produced can supply data regarding their operation to the controller 20. This data includes, for example, the actual engine torque and instantaneous speed of the output shaft. However, should the ICE used not include the necessary elements to supply actual engine torque and instantaneous speed of the output shaft, supplemental elements such as torque and speed sensors (not shown herein) can be used.

In conventional systems, the actual engine torque is not used in the determination of the CVT ratio set point. This can lead to stalling problems should the actual engine torque being close to the prime mover's limit when the ratio change is requested by the conventional control of the vehicle. On the other hand, when the actual engine torque is low, the conventional control of the CVT ratio can make the vehicle seem sluggish.

DETAILED DESCRIPTION

Figure 1:
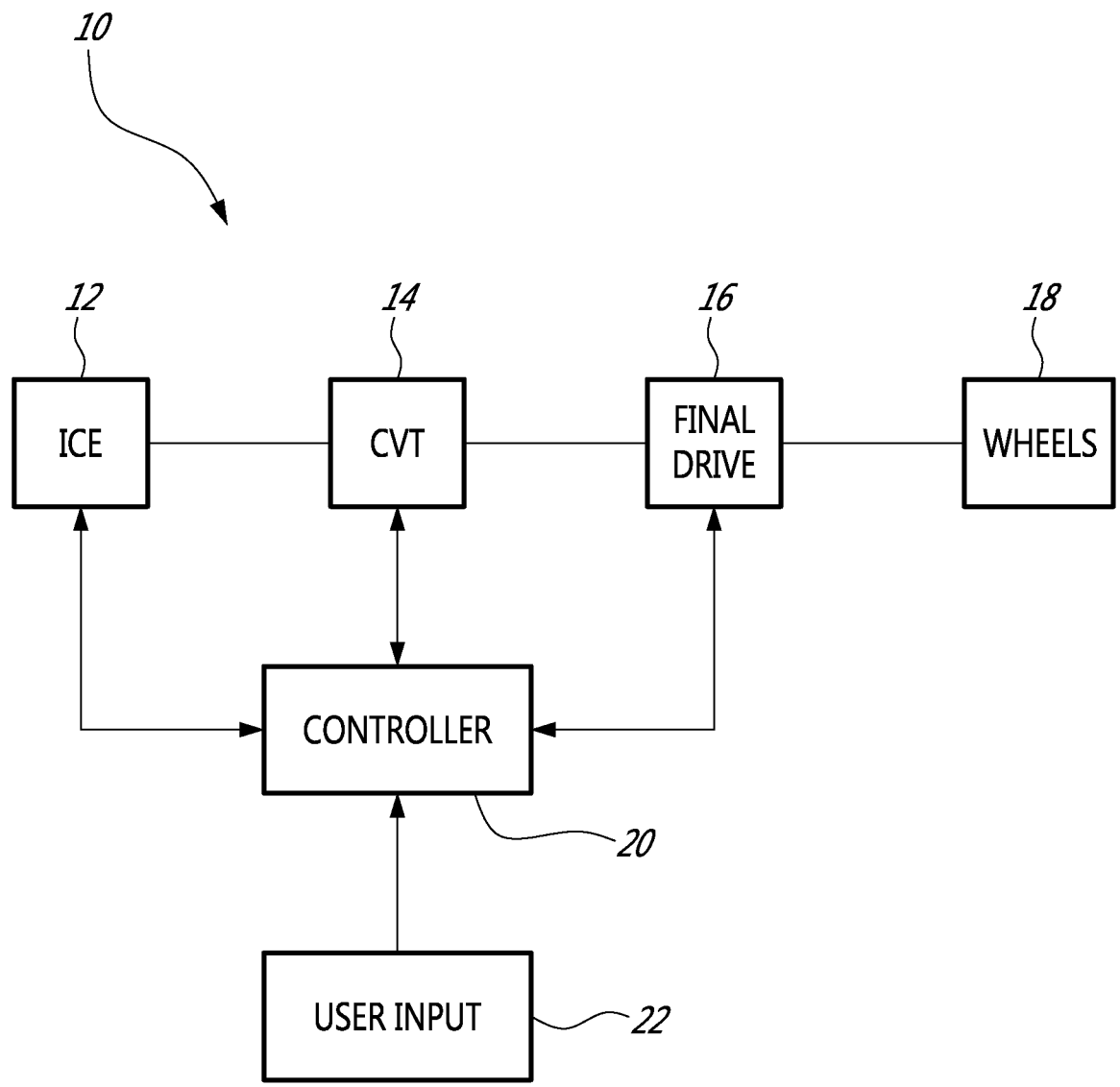
FIG. 1 is a schematic view of a drivetrain including a CVT.
Figure 2:
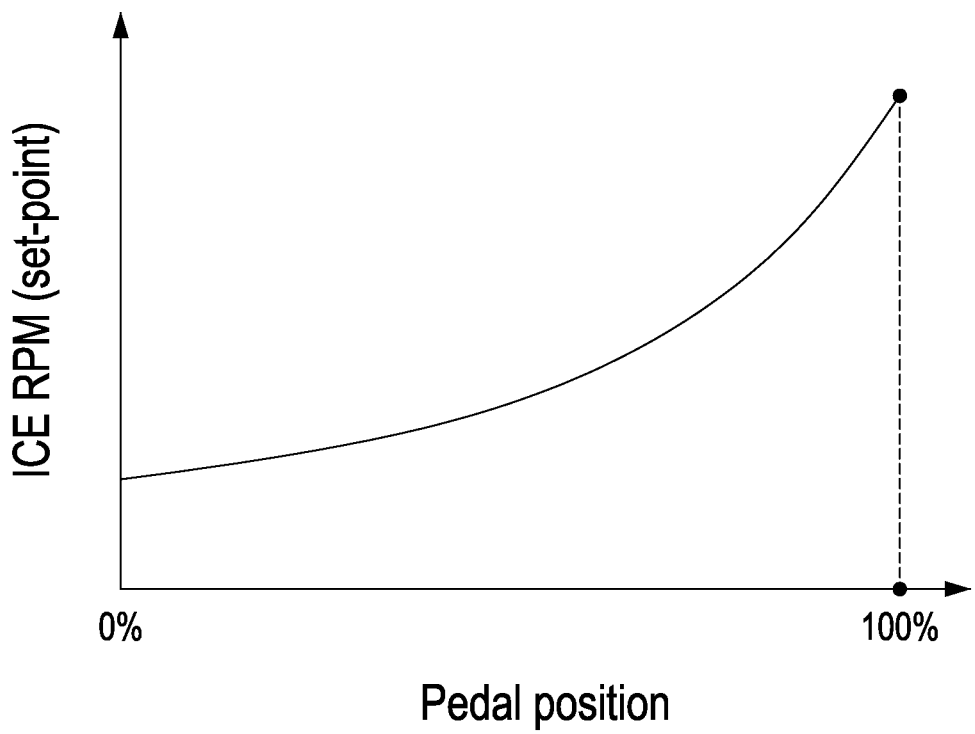
FIG. 2 is a graph illustrating the ICE RPM with respect to the acceleration pedal position.
Figure 3:
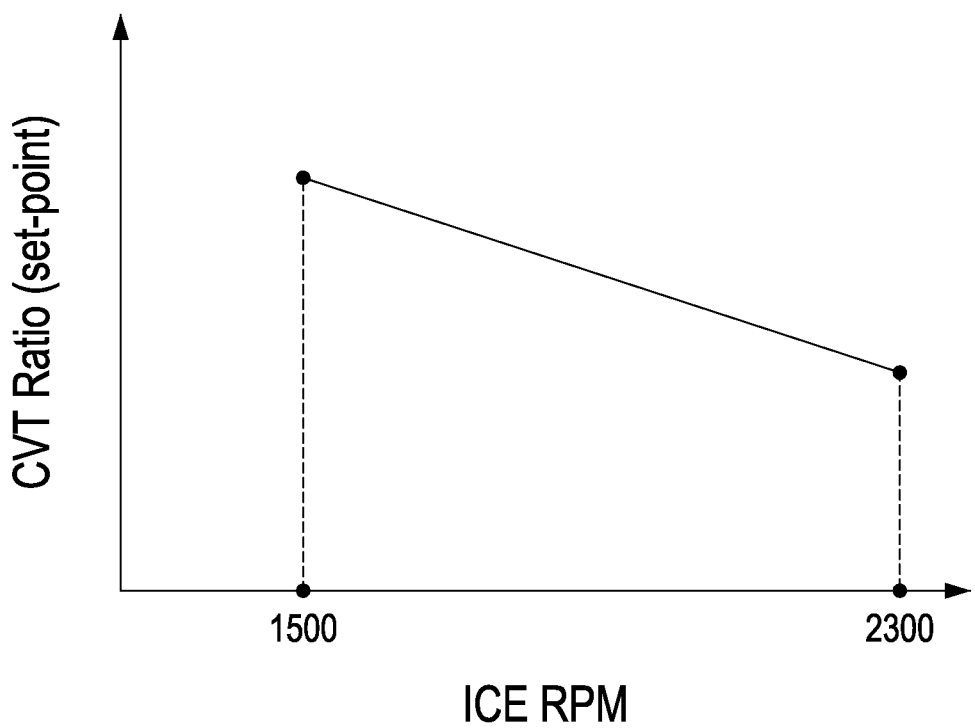
FIG. 3 is a graph illustrating the ratio set point of the CVT with respect to the ICE RPM.

An object is generally to provide an improved control method for a drivetrain including a CVT taking into account the actual engine torque of the prime mover.

According to an illustrative embodiment, there is provided a method for controlling the ratio set point of a Continuously Variable Transmission (CVT) having an input connected to a prime mover and an output; the method comprising: obtaining an actual RPM (Revolution Per Minute) value of the prime mover; obtaining an actual engine torque value of the prime mover; calculating the CVT ratio set point as a function of both the actual RPM value and the actual engine torque value; and controlling the CVT to reach the calculated CVT ratio set point.

According to another aspect, there is provided a drivetrain including a prime mover provided with an output shaft, a CVT and a controller connected to the prime mover and to the CVT; the CVT including an input shaft connected to the output shaft of the prime mover and an output shaft connected to wheels of a vehicle; the controller being so configured as to receive RPM data and actual engine torque data from the prime mover; the controller being so configured as to calculate a CVT ratio set point using the received RPM data and actual engine torque data and to control the CVT so that the calculated CVT ratio set point is reached.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine (ICE), a turbine engine, or any other mechanical power production element or assembly.

It is to be noted that while the expression "CVT", standing for Continuously Variable Transmission is to be construed, herein and in the appended claims as any type of Continuously variable transmission including, amongst others dual-cavity full toroidal CVT, half-toroidal CVT; single cavity toroidal CVT, Variable-diameter pulley CVT, Magnetic CVT, Ratcheting CVT, hydrostatic CVT, Cone CVT and planetary CVT. It is also to be noted that the term "CVT" is also to be construed, herein and in the appended claims, as a CVT provided with further elements allowing it to operate as an IVT, standing for Infinitely Variable Transmission, a subset of CVT designs in which the range of ratios of output shaft speed to input shaft speed includes a zero ratio.

It is to be noted that the expression "overdrive" when used herein in the context of a CVT, is to be construed herein and in the appended claims as a condition where the CVT ratio is such that the CVT output speed is higher than the CVT input speed.

It is to be noted that the expression "underdrive" when used herein in the context of a CVT, is to be construed herein and in the appended claims as a condition where the CVT ratio is such that the CVT output speed is lower than the CVT input speed.

It is to be noted that the term "drivetrain", used herein and in the appended claims, are to be construed as the intervening mechanism by which power is transmitted from a prime mover to a final drive as well as this mechanism plus the prime mover and/or the final drive.

The expressions "connected" and "coupled" are interchangeable and should be construed herein and in the appended claims broadly so as to include any cooperative or passive association between mechanical parts or components. For example, such parts may be assembled together by direct coupling or connection, or indirectly coupled or connected using further parts therebetween. The coupling and connection can also be remote, using for example a magnetic field or else.

The expression "input", without reference to a specific component such as a shaft, should be construed herein and in the appended claims, as including any movable part of an object, an assembly, a system or a mechanism that is used to receive a mechanical work from same or from another assembly, system or mechanism. Similarly, the expression "output" should be construed as including a similar part that is used to transfer a mechanical work.

The expression "ratio" should be construed herein and in the appended claims broadly as meaning the ratio between the speed of rotation at the input of a machine, system or assembly to that of the output thereof.

Other objects, advantages and features of the CVT control will become more apparent upon reading of the following non-restrictive description of illustrative embodiments thereof, given by way of example only with reference to the accompanying drawings.

Generally stated, the illustrative embodiments describe drivetrain controls and methods for controlling a drivetrain where the actual engine torque of the prime mover is taken into account. Illustrative embodiments include control systems and methods where the ratio set point of the CVT and/or the rate of the CVT ratio change are modified according to the actual engine torque of the ICE.

Figure 4:
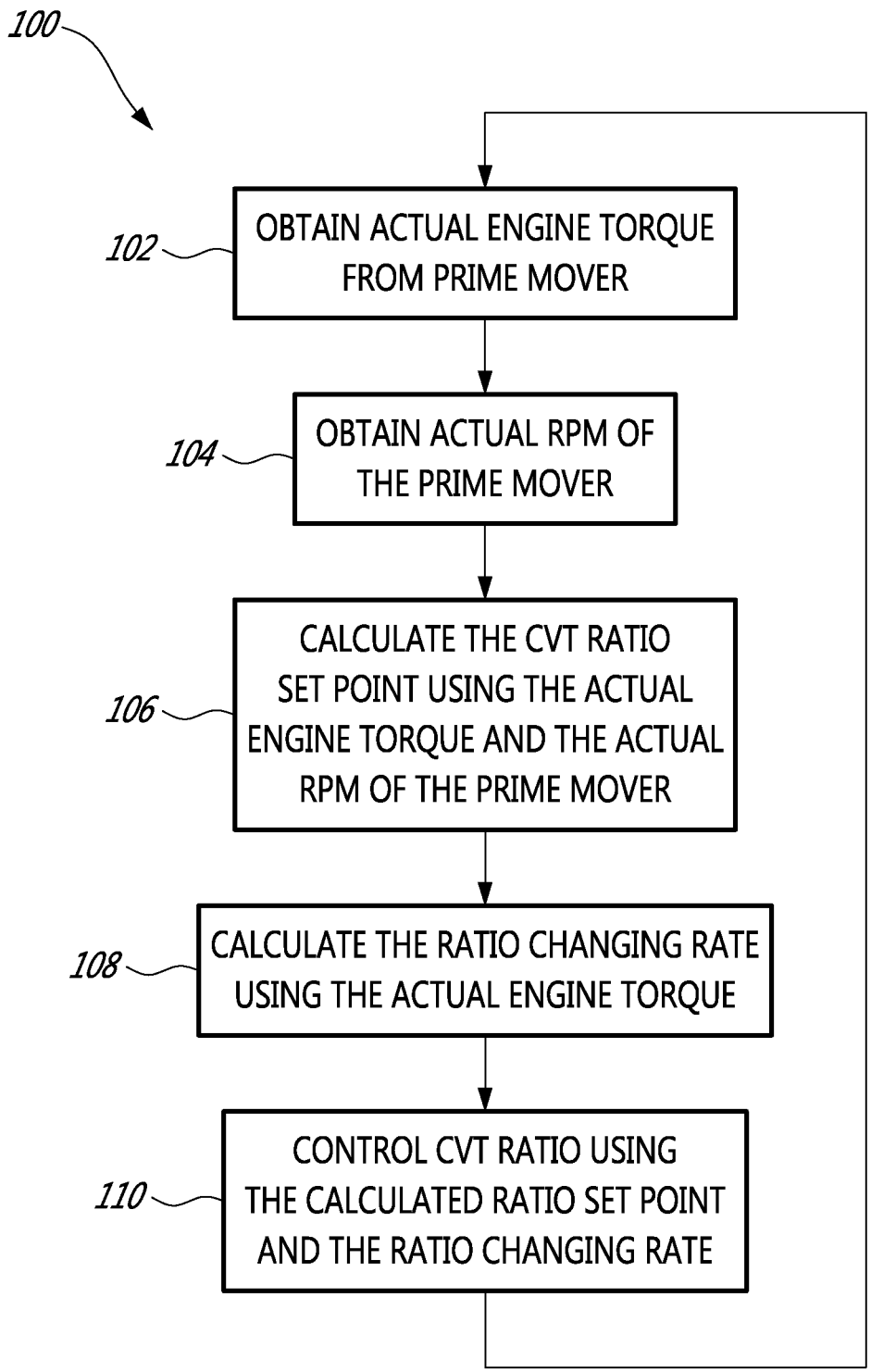
FIG. 4 is a flowchart of a method according to a first illustrative embodiment.

Turning now more specifically to FIG. 4 of the appended drawings, the general steps of a CVT control method 100 according to a first illustrative embodiment will be briefly described. First, the controller obtains the actual engine torque of the ICE and the actual RPM of the ICE in respective steps 102 and 104. Then, in step 106, the controller calculates the CVT ratio set point using the actual engine torque and the actual RPM obtained from the ICE. Step 108 consists in calculating the ratio changing speed using the actual engine torque. Finally, in step 110, the controller controls the CVT ratio using the calculated CVT ratio set point and the ratio changing rate.

As will be apparent to one skilled in the art, obtaining the actual engine torque and the actual RPM of the prime mover 12 as mentioned in steps 102 and 104 is pretty straightforward since the ICE 12 is in communication with the controller 20 as can be seen in FIG. 1. Without limitations, a conventional CAN bus (Controller Area Network) can be used to interconnect the various elements of the drivetrain 10.

As discussed above, step 106 consists in calculating the CVT ratio set point using the actual engine torque acquired in step 102 and the actual RPM of the ICE acquired in step 104. It has been found that it is interesting to use an averaging of the actual engine torque and of the actual RPM of the ICE in the calculations of the CVT ratio set point and of the ratio-changing rate of steps 106 and 108. Indeed, if the instantaneous values of the actual engine torque and of the RPM of the ICE are used in these calculations, short spikes of high torque or RPM values can cause instabilities in the control that lead to a deterioration of driving feelings. Many averaging techniques can be used including, for example, moving average, harmonic average and Infinite Impulse Response (IIR) filtered average.

Generally stated, for the calculation of the CVT ratio set point of the first illustrative embodiment, it is proposed a) to follow a first curve if the actual engine torque is below a predetermined low actual engine torque threshold, b) to follow a second curve if the actual engine torque is above a predetermined high actual engine torque threshold and c) to calculate an intermediate value located between the first and the second curves should the actual engine torque be between the low actual engine torque threshold value and the high actual engine torque threshold value.

In other words, the calculated ratio set point a) is located onto a first curve if the actual engine torque is below a predetermined low actual engine torque threshold, b) is located on a second curve if the actual engine torque is above a predetermined high actual engine torque threshold and c) is located between the first and second curve should the actual engine torque be between the low actual engine torque value and the high actual engine torque value.

Figure 5:
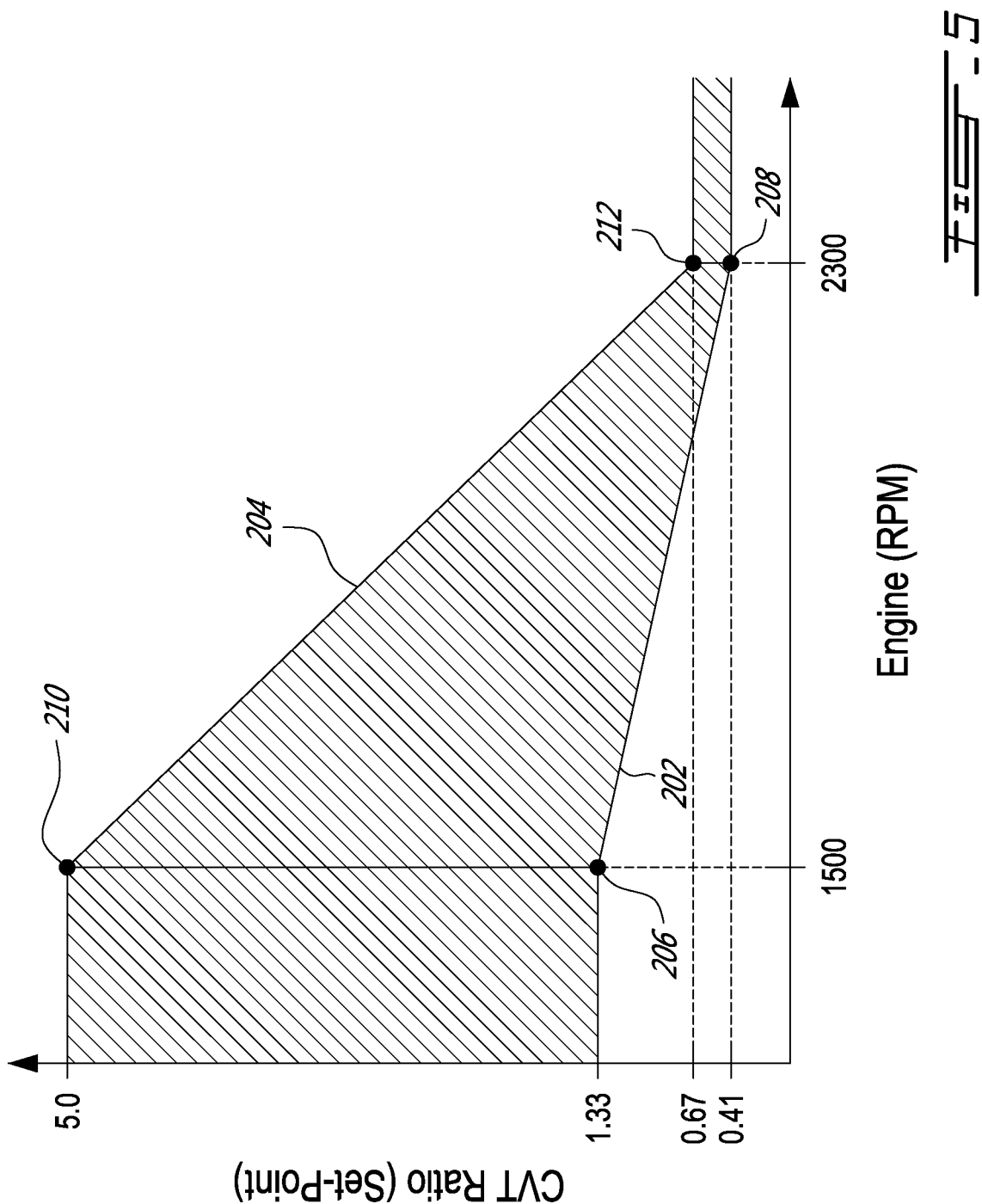
FIG. 5 is a graph illustrating the CVT ratio set point with respect to the ICE RPM according to the first illustrative embodiment.

FIG. 5 illustrates the first and second curves 202 and 204 and the area in between.

As will be apparent to one skilled in the art, the first curve 202 is used when the actual engine torque is low. Accordingly, in the usable RPM range from about 1500 to about 2300 RPM, the ratio goes from about 1.33 to about 0.41, which represents the full overdrive of the CVT 14. Since the actual engine torque is low, there is no problem going to the full overdrive ratio when the RPM of the ICE is high. It is to be noted that the ratio set point is in a plateau should the RPM have a value that is below or above the recommended RPM range.

It is to be noted that when the actual engine torque is low, the CVT ratio is not at the full underdrive when at low RPM of the prime mover. Indeed, starting at a ratio of about 1.33 improves the driving feelings of the vehicle since it allows for brisker accelerations.

The second curve 204 is used when the actual engine torque is high. Accordingly, the CVT ratio set point is higher at the lowest RPM to thereby maximize the available torque at the output of the CVT. In fact, the CVT ratio set point is at the full underdrive value of 5 when the engine RPM is at about 1500. When the engine RPM reaches the maximum usable value of 2300 RPM, the CVT ratio set point does not reach the full overdrive value but is limited to a ratio of about 0.67. This is interesting since it limits the maximal wheel speed that can be reached when the actual engine torque is high, which generally means that the vehicle is loaded and should not go full speed.

When the actual engine torque is between the low threshold value and the high threshold value, the controller calculates the CVT ratio set point value, for example by a linear interpolation.

In other words, for a given engine RPM value, the speed of the output shaft of the CVT decreases as the actual engine torque increases.

It is believed to be within the reach of one skilled in the art to configure the controller 20 so that the above-described calculations can be made.

It is to be noted that the low and the high actual engine torque threshold values can be determined according to a particular drivetrain and to the desired driving characteristics of the drivetrain. Similarly, the four points (206-212) defining the two curves 202 and 204 can also be selected to give the desired characteristics of the drivetrain.

As a non-limiting example, a low actual engine torque threshold could be 70% of the maximal actual engine torque and the high engine torque threshold could be set at 95% of the maximal actual engine torque.

The four points 206-212 defining the curves 202 and 204 have been selected for the particular drivetrain 10 so that when the actual engine torque is low, which generally means that the load of the vehicle is low, the acceleration of the vehicle feels lively and when the actual engine torque is high, which generally means that the vehicle is loaded, the acceleration is slower, the maximal speed is lower and the usable torque at the wheels is higher.

It is to be noted that the CVT ratio set point values mentioned hereinabove are the set points determined in the controller 20. The controller 20 is so configured as to know the actual full overdrive and full underdrive ratio values of the CVT 14 connected thereto. Accordingly, the controller 20 limits the calculated CVT ratio set points supplied to the CVT 14 to values that the CVT can reach.

Step 108 consists in calculating the CVT ratio changing rate using the actual engine torque acquired. Again, for the reasons stated above, it has been found that it is interesting to use an averaging of the actual engine torque in this calculation.

Figure 6:
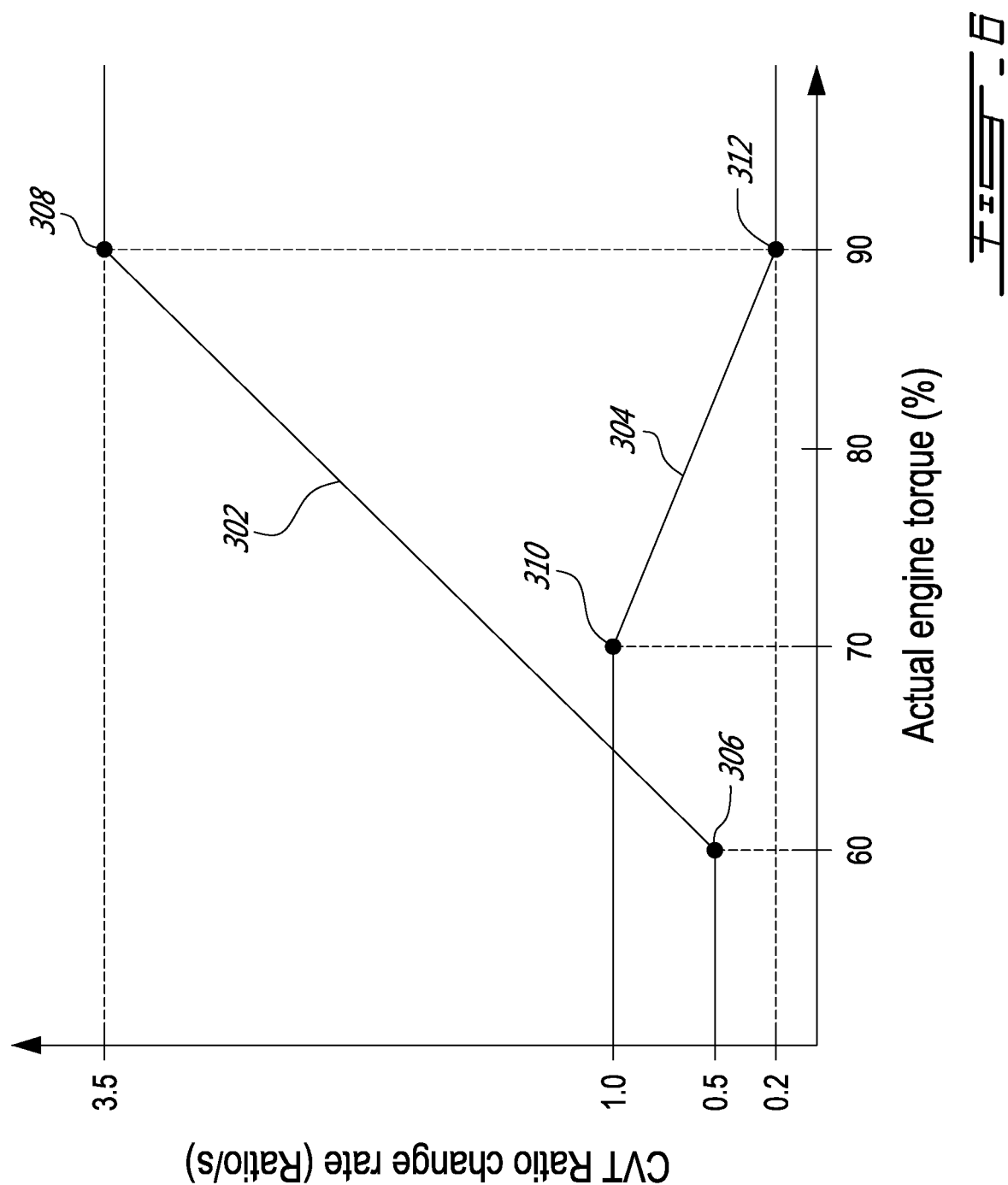
FIG. 6 is a graph illustrating the CVT ratio changing rate with respect to the actual engine torque according to the first illustrative embodiment.

FIG. 6 is a graph illustrating two curves of the CVT ratio changing rate with respect to the actual engine torque. A first curve 302 is followed when the CVT ratio moves from the overdrive towards the underdrive and a second curve 304 is followed when the CVT ratio moves from the underdrive towards the overdrive.

Generally stated, the curve 302 indicates that, during a move towards the underdrive, the CVT ratio changing rate increases with the increase of the actual engine torque. Accordingly, when the ICE develops a high torque and the controller determines that a CVT ratio set point change towards the underdrive is required, this ratio change happens quickly. This is interesting since the CVT ratio set point change request may be due to a sudden increase in the torque level and that a ratio change towards the underdrive increases the usable torque at the wheels and decreases the likelihood of engine stall.

On the other hand, the CVT ratio changing rate may be slower when a similar CVT ratio set point change towards the underdrive is requested while the actual engine torque is low since, when this is the case, the ICE is not about to stall. It is interesting to have such a slow ratio changing rate towards the underdrive to avoid a braking sensation when the accelerator pedal is released.

Generally stated, the curve 304 indicates that, during a move towards the overdrive, the CVT ratio changing rate decreases with the increase of the actual engine torque. Accordingly, when the ICE develops a high torque and the controller determines that a CVT ratio set point change towards the overdrive is required, this ratio change will happen slowly.

On the other hand, the CVT ratio changing rate may be faster when a similar CVT ratio set point change towards the overdrive is requested while the actual engine torque is low since it generally means that the user desires an acceleration of the vehicle and that the ICE 12 is not about to stall since the actual engine torque is low.

It is to be noted that the four points (306-312) defining the two curves 302 and 304 can be determined according to a particular drivetrain and to the desired driving characteristics of the drivetrain.

The four points 306-312 defining the curves 302 and 304 have been selected for the particular drivetrain 10 so that when the actual engine torque is low, which generally means that the load of the vehicle is low, the acceleration of the vehicle feels lively and when the actual engine torque is high, which generally means that the vehicle is loaded, the acceleration is slower.

One skilled in the art will understand that while the method above describes the calculation and the use of a ratio changing rate, it would be possible to design a controller that would change the ratio rate at a predetermined and constant speed.

Figure 7:
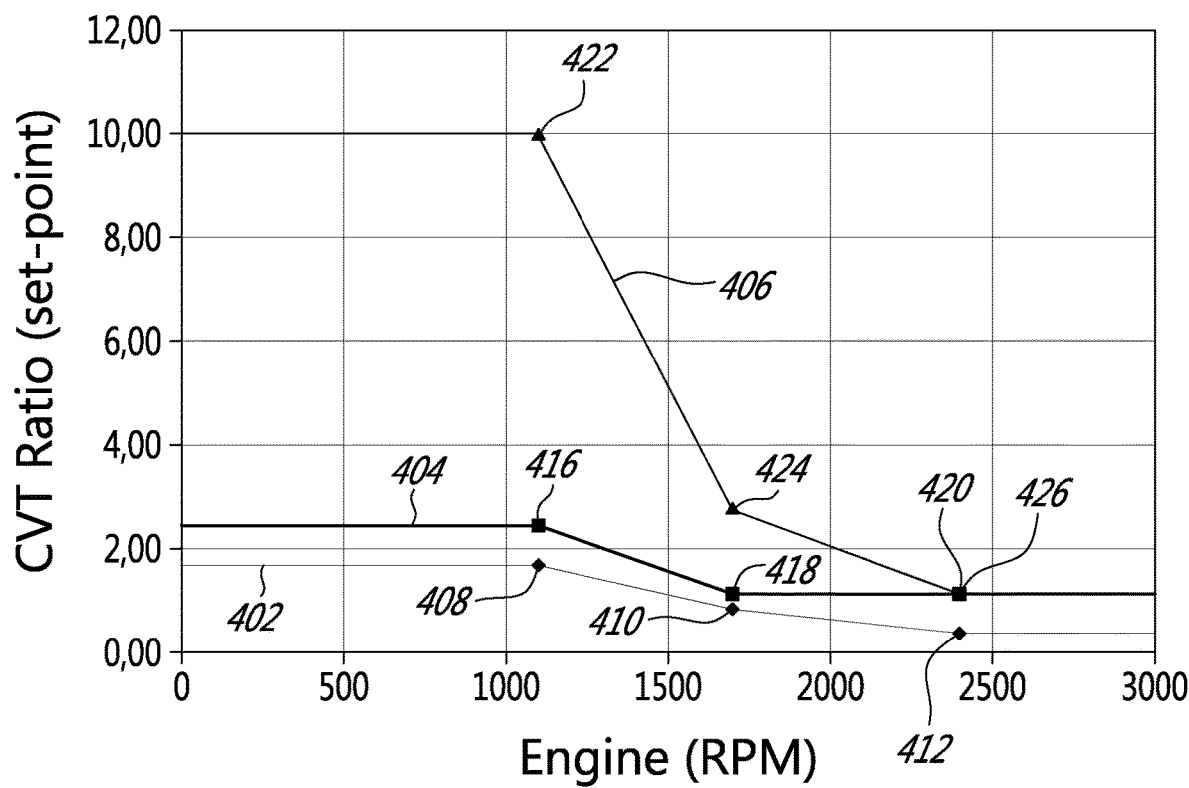
FIG. 7 is a graph illustrating the CVT ratio set point with respect to the ICE RPM according to a second illustrative embodiment

Turning now to FIG. 7 a second illustrative embodiment of the calculation of the CVT ratio set point with respect to the actual engine torque of the prime mover will be described.

Generally stated, for this second illustrative embodiment of the determination of the CVT ratio set point (Step 106 of FIG. 4), it is proposed a) to follow a first curve if the actual engine torque is below a predetermined low actual engine torque threshold value, b) to follow a second curve if the actual engine torque is at a predetermined medium actual engine torque threshold value, c) to calculate an intermediate value located between the first and the second curves should the actual engine torque be between the low actual engine torque threshold value and the medium actual engine torque threshold value, d) to follow a third curve if the actual engine torque is above a predetermined high actual engine torque threshold value, and e) to calculate an intermediate value located between the second and the third curves should the actual engine torque be between the medium actual engine torque threshold value and the high actual engine torque threshold value.

In other words, the calculated ratio set point a) is located onto a first curve if the actual engine torque is below a predetermined low actual engine torque threshold value, b) is located on a second curve if the actual engine torque is at a predetermined medium actual engine torque threshold value, c) is located between the first and second curve should the actual engine torque be between the low actual engine torque threshold value and the medium actual engine torque threshold value, d) is located on a third curve if the actual engine torque is above a predetermined high actual engine torque threshold value, and e) is located between the second and third curve should the actual engine torque be between the medium actual engine torque threshold value and the high actual engine torque threshold value.

FIG. 7 illustrates the first, second and third curves 402, 404 and 406 and the area in between.

As will be apparent to one skilled in the art, the first curve 402 is used when the actual engine torque is low. As a non-limiting example, the first curve can be used when the actual engine torque is less than about 50% of the maximal actual engine torque. Accordingly, in the medium RPM range from about 1100 to about 1700 RPM, the ratio goes from about 1.67 to about 0.83. In the high RPM range from about 1700 to about 2400 RPM, the ratio goes from about 0.83 to about 0.37, which is the full overdrive ratio of the CVT. Since the actual engine torque is low, there is no problem going to the full overdrive ratio when the RPM of the ICE is high. It is to be noted that the ratio set point is in a plateau should the RPM have a value that is below or above the recommended RPM range.

It is to be noted that when the actual engine torque is low, the CVT ratio is not at the full underdrive when at low RPM of the prime mover. Indeed, starting at a ratio of about 1.67 improves the driving feelings of the vehicle since it allows for brisker accelerations.

The second curve 404 is used when the actual engine torque is medium. As a non-limiting example, the second curve can be used when the actual engine torque is at the medium threshold value of about 70%. A can be seen from FIG. 7, the ratio of the second curve 404 is higher than the ratio of the first curve 402 and the decrease of this second curve 404 is steeper than the first curve 402 when the Engine RPM goes from about 1100 to about 1700 RPM. In the medium RPM range from about 1100 to about 1700 RPM, the ratio goes from about 2.44 to about 1.11. In the high RPM range from about 1700 to about 2400 RPM, the ratio stays at 1.11. Therefore, when the RPM ranges from about 1700 to about 2400 RPM, and the actual engine load is about 70%, the ratio stays the same. Accordingly, when the actual engine torque is medium, the CVT will not reach full overdrive.

When the actual engine torque is between the low threshold value and the medium threshold value, the controller calculates the CVT ratio set point value, for example by a linear interpolation.

The third curve 406 is used when the actual engine torque is high. As a non-limiting example, the second curve can be used when the actual engine torque is about 95% and above. Accordingly, the CVT ratio set point is higher at the lowest RPM to thereby maximize the available torque at the output of the CVT. In fact, the CVT ratio set point is at the full underdrive value of 10 when the engine RPM is at about 1100. Between the 1100 and 1700 RPM, the ratio linearly passes from 10 to about 2.78. In the high RPM range from about 1700 to about 2400 RPM, the ratio linearly drops from 2.78 to about 1.11. Accordingly, the CVT ratio set point does not reach the full overdrive value but is limited to a ratio of about 1.11. This is interesting since it limits the maximal wheel speed that can be reached when the actual engine torque is high, which generally means that the vehicle is loaded and should not go full speed.

When the actual engine torque is between the medium threshold value and the high threshold value, the controller calculates the CVT ratio set point value, for example by a linear interpolation.

In other words, for a given engine RPM value, the speed of the output shaft of the CVT decreases as the actual engine torque increases.

It is believed to be within the reach of one skilled in the art to configure the controller 20 so that the above-described calculations can be made. As a non-limiting example, look-up tables could be build and stored in the controller.

It is to be noted that the low, medium and high actual engine torque threshold values can be determined according to a particular drivetrain and to the desired driving characteristics of the drivetrain. Similarly, the nine points (408-426) defining the three curves 402, 404 and 406 can also be selected to give the desired characteristics of the drivetrain.

By using three curves 402-406 instead of the two curves 202 and 204 of FIG. 5, the drivetrain designer has more options to create the desired characteristics of the drivetrain. Indeed, the characteristics of the drivetrain can be different in the low to medium RPM range than in the medium to high RPM range. Similarly, the characteristics of the drivetrain can be different in the low to medium actual engine torque range than in the medium to high actual engine torque range.

One skilled in the art will understand that while the various curves illustrating the calculation of the CVT ratio set point or ratio changing rate are for illustration and could be replaced by look up tables that would be used by the CVT controller.

Figure 8:
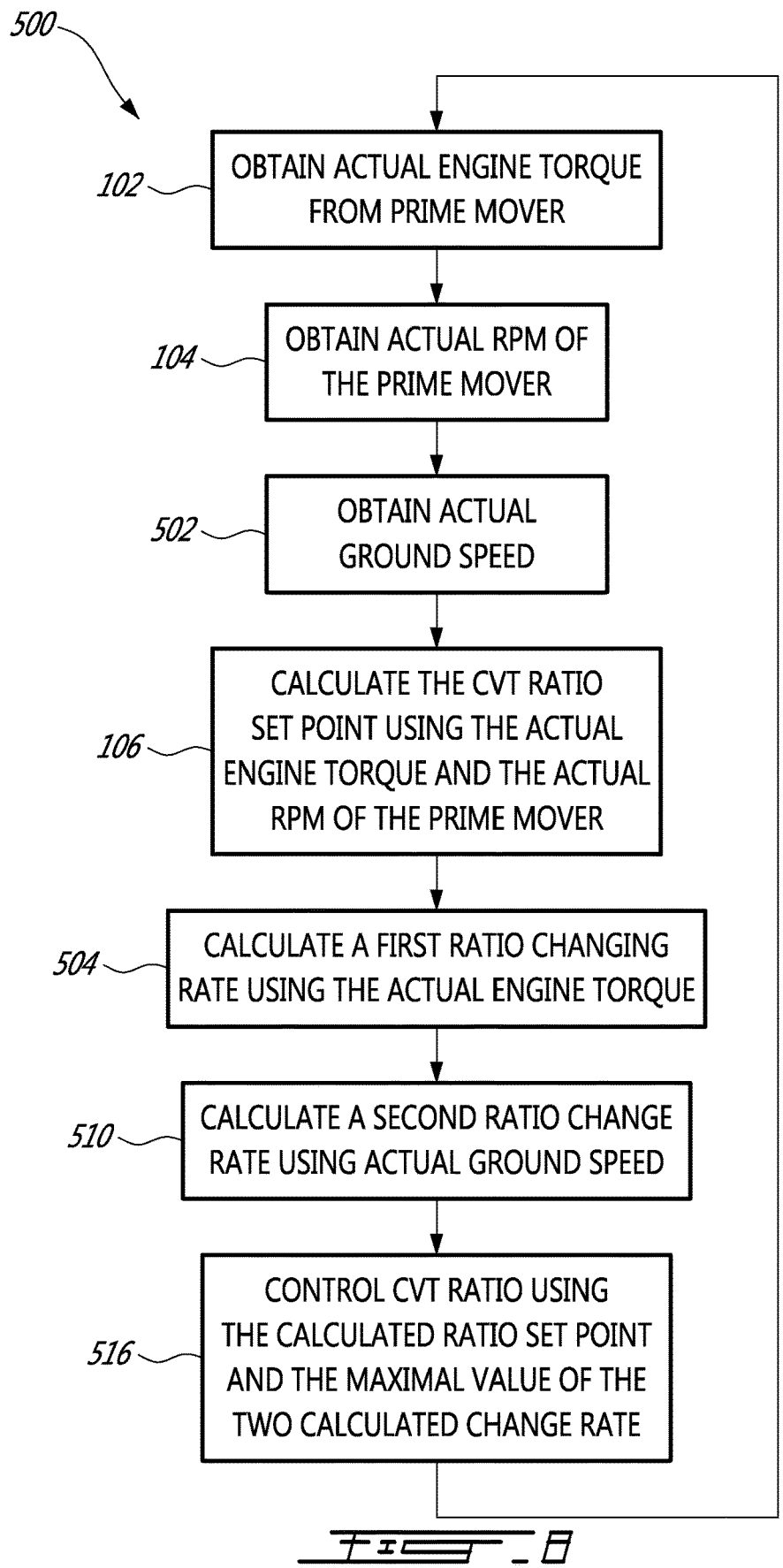
FIG. 8 is a flowchart of a method according to a third illustrative embodiment.
Figure 9:
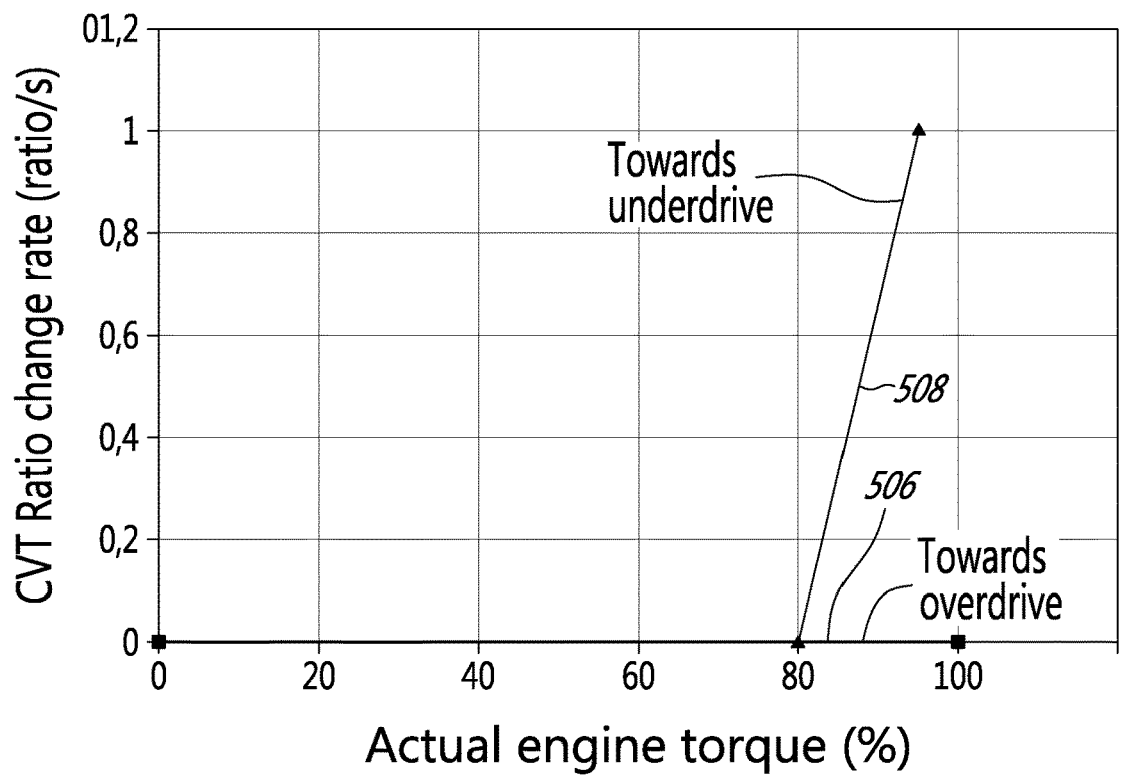
FIG. 9 is a graph illustrating the CVT ratio changing rate with respect to the actual engine torque according to the third illustrative embodiment.
Figure 10:
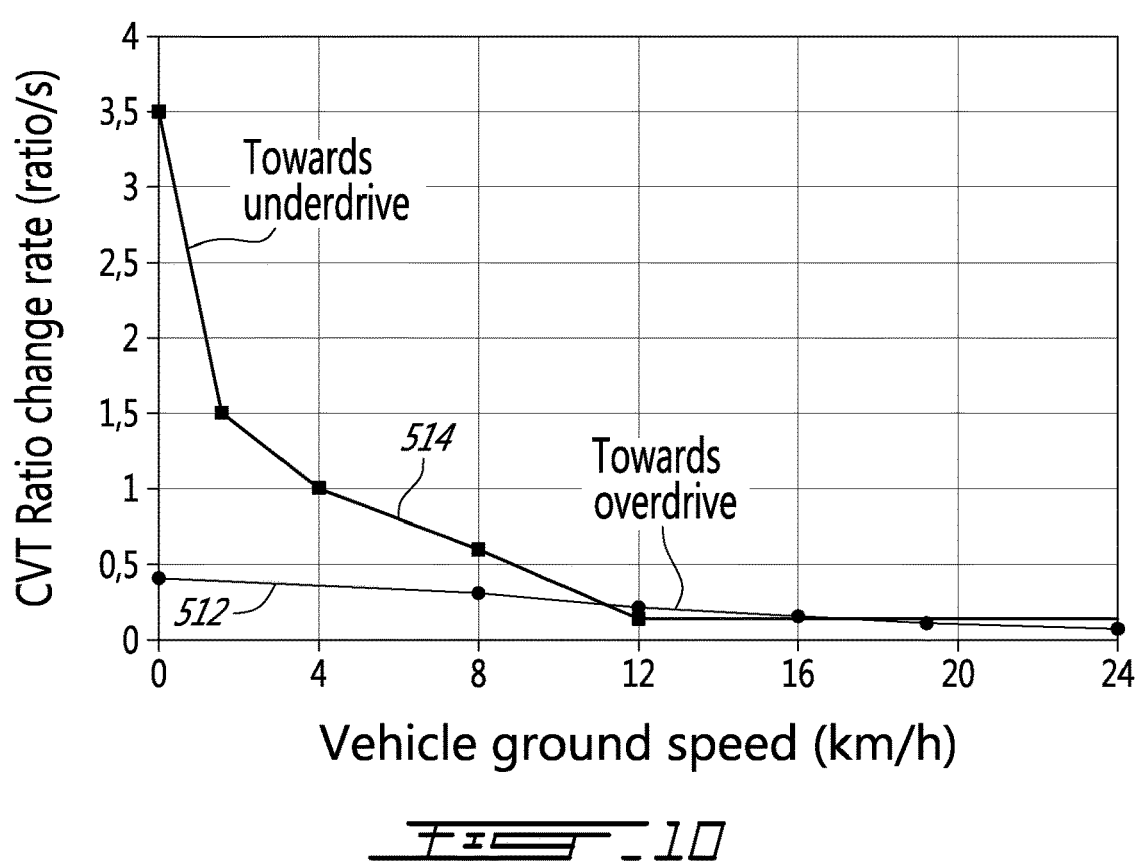
FIG. 10 is a graph illustrating the CVT ratio changing rate with respect to the actual ground speed according to the third illustrative embodiment.

Turning now to FIGS. 8 to 10, a control method 500 according to a third illustrative embodiment will be described. It is to be noted that since some of the steps of method 500 are identical to the corresponding steps of method 100 illustrated in FIG. 4 and described hereinabove, and for concision purpose, only the differences between these methods will be described in details hereinbelow.

Steps 102 and 104 are performed to acquire the actual engine torque and the actual RPM of the prime mover.

In step 502, the actual ground speed of the vehicle is acquired. One skilled in the art will understand that there are many methods to supply this data to the controller. As a non-limiting example, by knowing the diameter of the wheels and the speed of the output of the final drive 16 (FIG. 1) the controller can calculate the ground speed.

In step 106, the CVT ratio set point is calculated. As non-limiting examples, this calculation can be made according to the curves shown in FIG. 4 or those shown in FIG. 7.

In step 504, a first CVT ratio changing rate is calculated. This first ratio changing rate is determined using the actual engine torque. FIG. 9 is a graph illustrating two curves of the CVT ratio-changing rate. A first curve 506 is used when the ratio is moved towards the overdrive while a second curve 508 is used when the ratio moves towards the underdrive. As can be seen from this figure, the ratio changing rate is zero when the ratio moves towards the overdrive and, when the ratio moves towards the underdrive, the ratio changing rate has a value of zero from 0 to about 80% of the actual engine torque and increases linearly to 1 ratio per second when the actual engine torque reaches 95%.

In step 510, a second CVT ratio changing rate is calculated. This second ratio changing rate is determined using the actual ground speed of the vehicle. FIG. 10 is a graph illustrating two curves to determine the CVT ratio changing rate. A first curve 512 is used when the ratio is moved towards the overdrive while a second curve 514 is used when the ratio moves towards the underdrive. Generally stated, as can be seen from this figure, the ratio changing rate generally decreases with ground speed increases. When the ratio moves towards the overdrive, the ratio changing rate linearly ranges from about 0.4 ratio/s at 0 km/h (kilometer per hour) to about 0.1 ratio/s at 24 km/h. When the ratio moves towards the underdrive, the ratio changing rates ranges from about 3.5 ratio/s at 0 km/h to about 0.14 ratio/s at 12 km/h and stays at this value for higher ground speeds.

As will be understood by one skilled in the art, it is interesting to change the ratio slower as the ground speed increases.

It is to be noted that the vehicle to which the driveline is provided is a work vehicle having a top speed of about 24 km/h (about 15 miles per hour).

In step 516, the CVT ratio is controlled using the set point calculated in step 106. The speed at which the CVT ratio is brought to the set point is the maximal value of the first and second ratio changing rates calculated in steps 504 and 510. Accordingly, when the ratio moves towards the overdrive, the ratio changing rate speed will be the value calculated in step 510 since the value from step 540 is zero.

In other words, the ratio changing rate is determined using the ground speed when the ratio moves towards the overdrive or when the ratio moves towards the underdrive and the actual engine torque is below about 80%. When the ratio moves towards the underdrive and the actual engine torque is above 80%, the ratio-changing rate is the maximal value of the two calculated ratio-changing rates.

Figure 11:
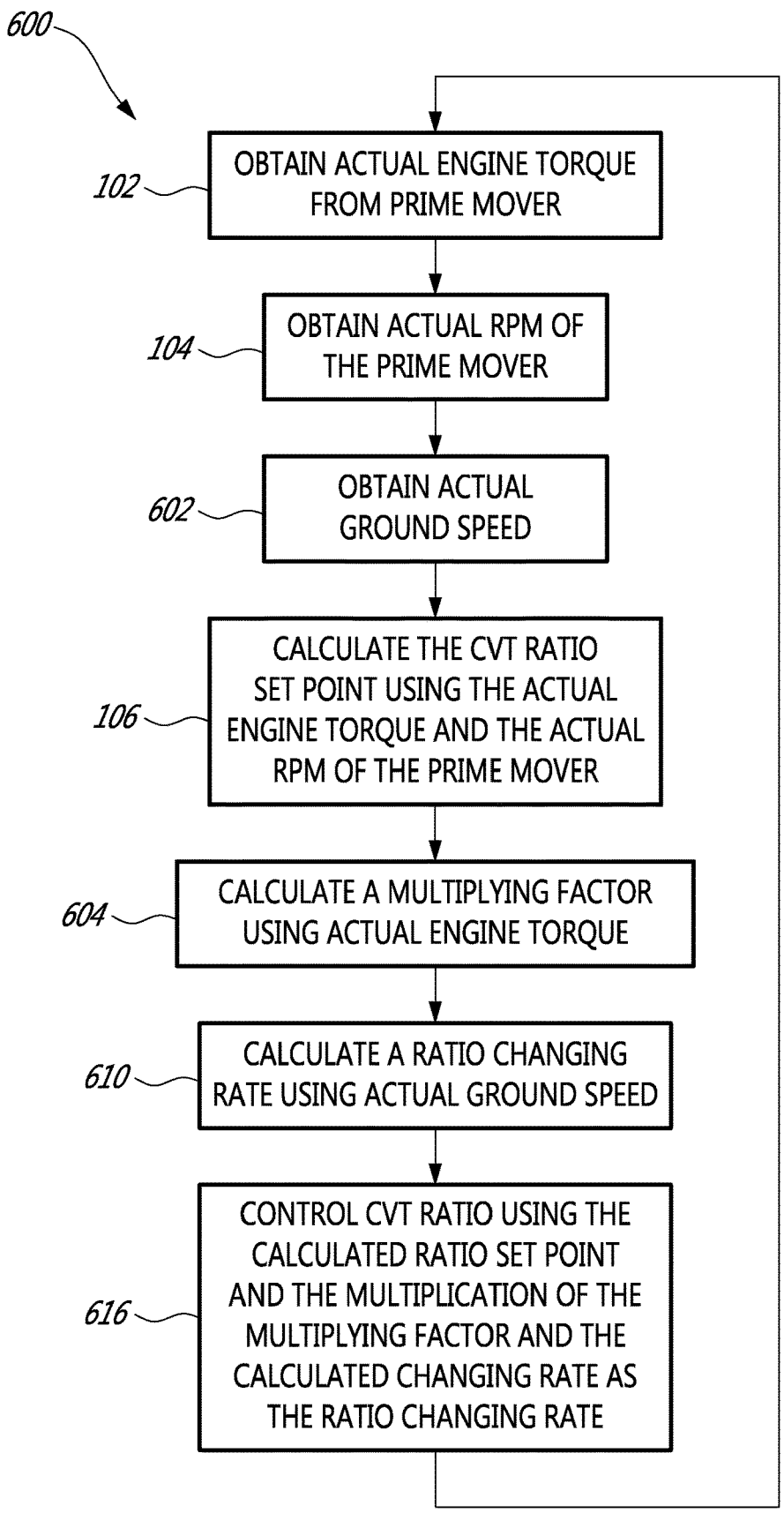
FIG. 11 is a flowchart of a method according to a fourth illustrative embodiment.
Figure 12:
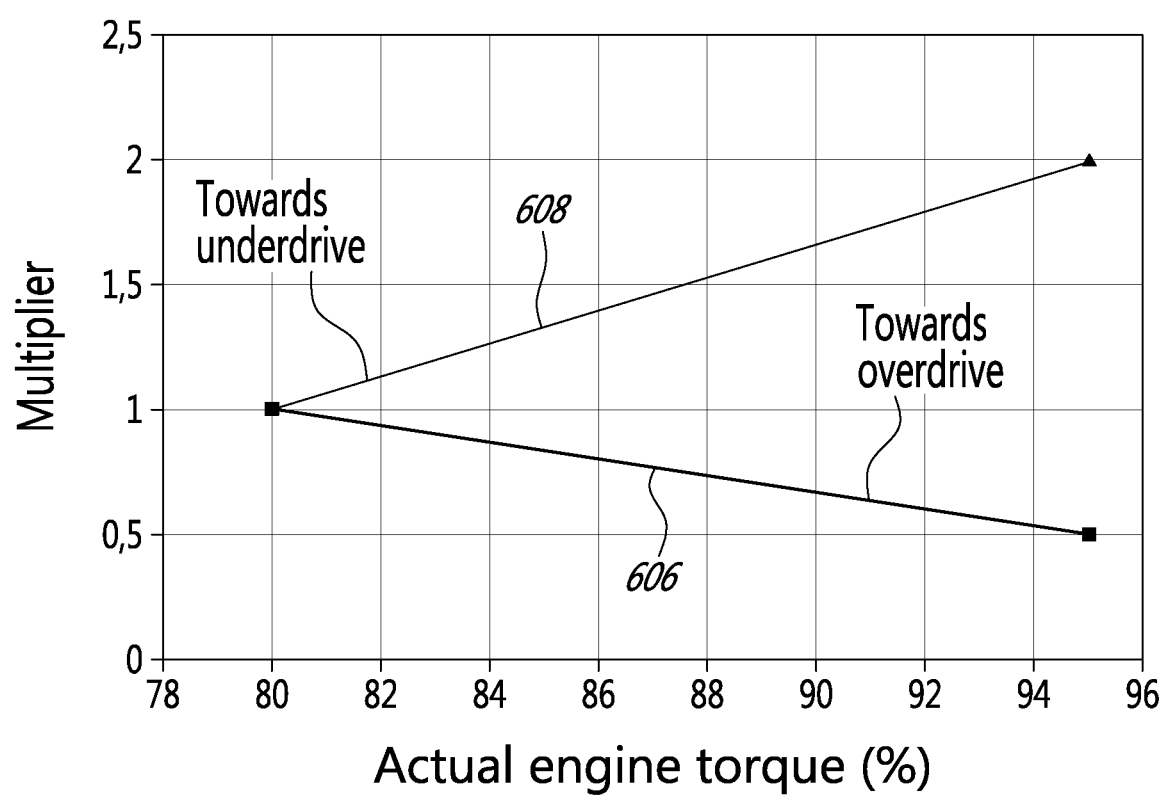
FIG. 12 is a graph illustrating the CVT ratio changing rate multiplier with respect to the actual engine torque.

Turning now to FIGS. 11 to 13, a control method 600 according to a fourth illustrative embodiment will be described. It is to be noted that since some of the steps of method 600 are identical to the corresponding steps of methods 100 illustrated in FIG. 4 and described hereinabove, and for concision purpose, only the differences between these methods will be described in details hereinbelow.

Steps 102 and 104 are performed to acquire the actual engine torque and the actual RPM of the prime mover.

In step 602, the actual ground speed of the vehicle is acquired. Again, one skilled in the art will understand that there are many methods to supply this data to the controller. As a non-limiting example, by knowing the diameter of the wheels and the speed of the output of the final drive 16 (FIG. 1) the controller can calculate the ground speed.

In step 106, the CVT ratio set point is calculated. As non-limiting examples, this calculation can be made according to the curves shown in FIG. 4 or those shown in FIG. 7.

In step 604, a multiplying factor is determined. FIG. 12 is a graph illustrating the determination of the multiplying factor depending on the actual engine torque and on the direction of the ratio change. More specifically, curve 606 is used when the ratio moves towards the overdrive and curve 608 is used when the ratio moves towards the underdrive.

As can be seen from FIG. 12, the multiplying factor is 1 when the actual engine torque is below 80%. When the actual engine torque is between 80 and 95%, the multiplying factor ranges from 1 to 0.5 when the ratio moves towards the overdrive and ranges from 1 to 2 when the ratio moves towards the underdrive.

In step 610, a ratio changing rate using the actual ground speed is determined.

Figure 13A:
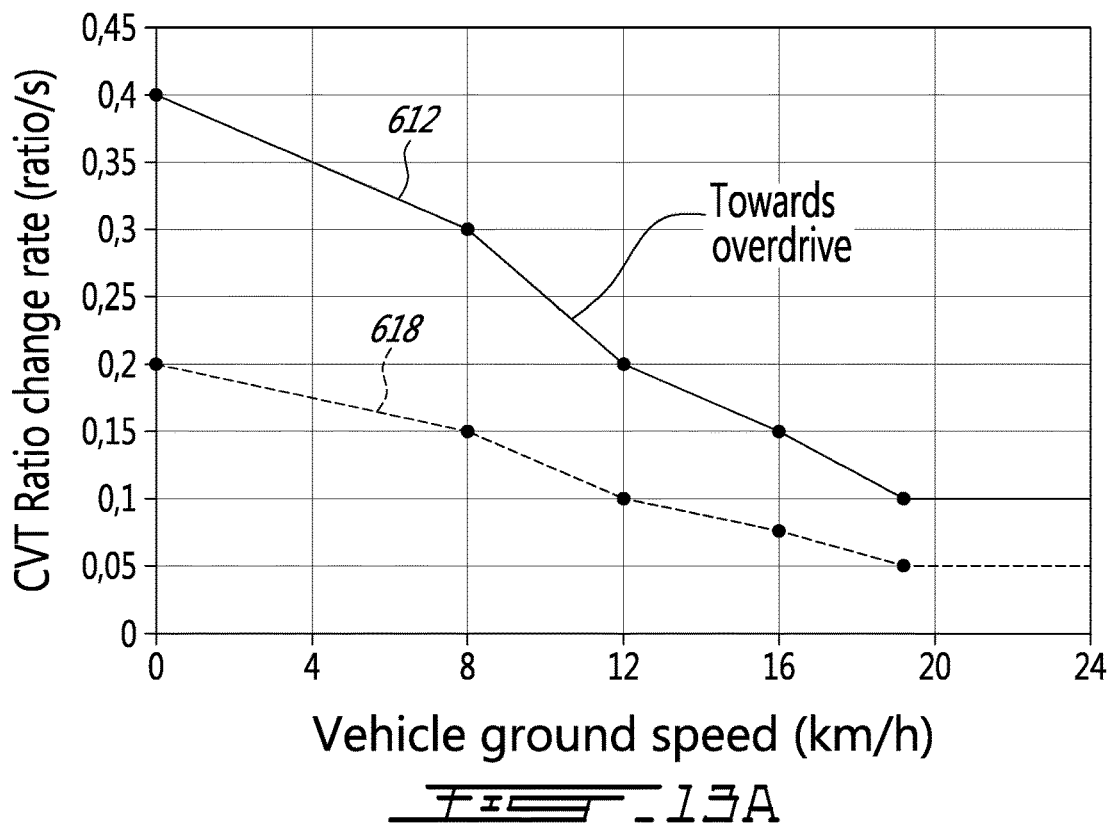
FIGS. 13A and 13B are graphs illustrating the CVT ratio changing rate with respect to the actual ground speed according to the fourth illustrative embodiment.

FIG. 13A illustrates a graph of the ratio changing rate with respect to the vehicle ground speed when the CVT ratio moves towards the overdrive. The curve 612 illustrates the CVT change rate (in ratio per second).

Figure 13B:
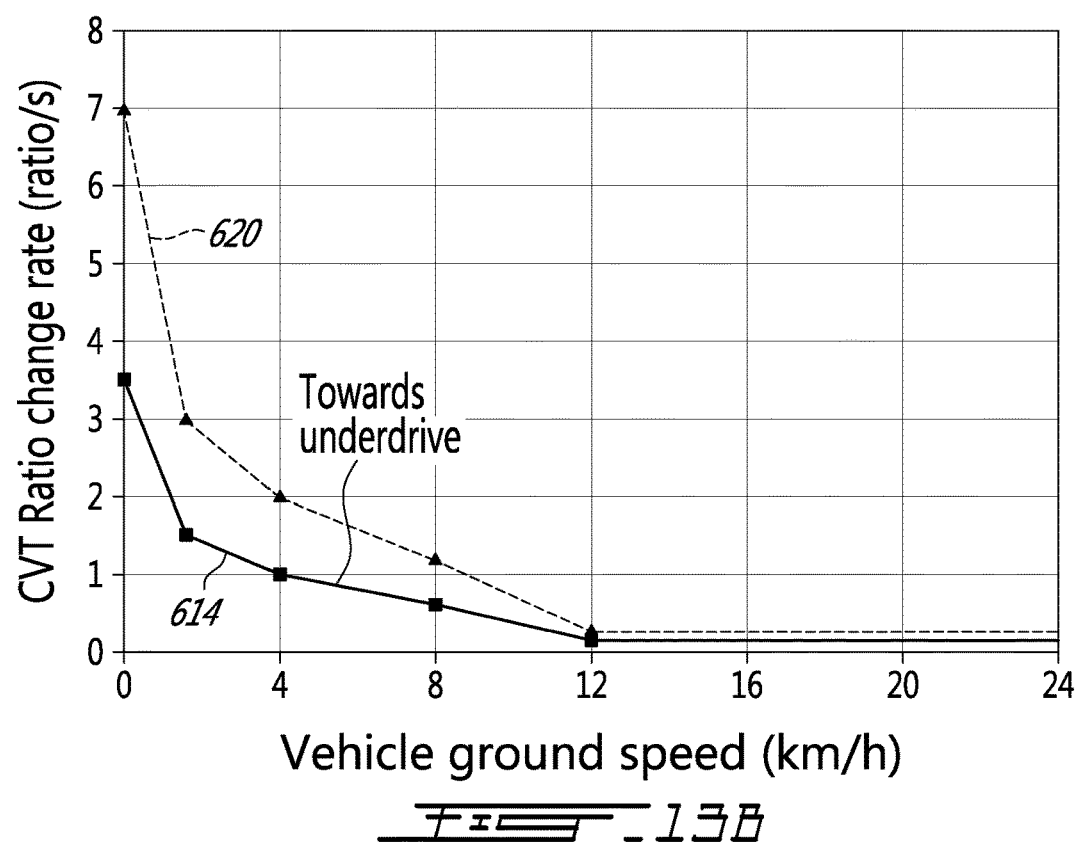

FIG. 13B illustrates a graph of the ratio changing rate with respect to the vehicle ground speed when the CVT ratio moves towards the underdrive. The curve 614 illustrates the CVT change rate (in ratio per second).

In step 612, the CVT ratio is controlled using the set point calculated in step 106. The speed at which the CVT ratio is brought to the set point is the multiplication of the multiplying factor determined in step 604 and the ratio changing rate determined in step 610.

FIG. 13A illustrates, in a dashed line curve 618 the result of the multiplication of step 612 when the ratio moves towards the overdrive and the actual engine torque is 95%. One can see that the curve 618 is the result of the multiplication of curve 612 by 0.5.

FIG. 13B illustrates, in a dashed line curve 620 the result of the multiplication of step 612 when the ratio moves towards the underdrive and the actual engine torque is 95%. One can see that the curve 618 is the result of the multiplication of curve 614 by 2.

Again, it is to be noted that the vehicle to which the driveline is provided is a work vehicle having a top speed of about 24 km/h (about 15 miles per hour).

In the methods illustrates in FIGS. 4, 8 and 11, one skilled in the art will understand that the order of some of the steps may be different than illustrated. As non-limiting examples, the order of the acquisition of data can be different and the order of the calculation of the CVT ratio set point and of the CVT ratio rate change can be different.

While four illustrative embodiments have been described hereinabove, one skilled in the art will understand that portions of one embodiment could be used with other embodiments. As a non-limiting example, for determining the ratio changing rate, one could use the max technique shown in FIGS. 8 to 10 when the ratio moves towards the overdrive and the multiplication technique shown in FIGS. 11 to 13B when the ratio moves towards the underdrive.

It is to be noted that while the above description shows graphs with numbers, these numbers depend on many factors of the drivetrain, of the vehicle to which this drivetrain is attached and to the drive and feel desired. Indeed, the weight of the vehicle, the size and capacity of the prime mover, the specifics of the CVT used are all factors entering in the design of the drivetrain and of the control parameters of the drivetrain.

As mentioned above, many of the ICE currently produced can supply data regarding their operation to the controller 20. This data include, for example, the actual engine torque and instantaneous speed of the output shaft. However, should the ICE used not include the necessary elements to supply actual engine torque and instantaneous speed of the output shaft, supplemental elements such as torque and speed sensors (not shown herein) can be used. For the sake of concision, in the present description and in the appended claims, the actual engine torque and shaft speed data are considered as being supplied by the ICE even if this data is supplied by such supplemental elements.

It is to be understood that the CVT ratio control is not limited in its application to the details of construction and parts illustrated in the accompanying drawings and described hereinabove. The CVT ratio control is capable of other embodiments and of being practiced in various ways. It is also to be understood that the phraseology or terminology used herein is for the purpose of description and not limitation. Hence, although the CVT ratio control has been described hereinabove by way of illustrative embodiments thereof, it can be modified, without departing from the spirit, scope and nature thereof.

The following numbered clauses are offered as a further description:

1. A method for controlling the ratio set point of a Continuously Variable Transmission (CVT) having an input connected to a prime mover and an output; the method comprising: obtaining an actual RPM (Revolution Per Minute) value of the prime mover; obtaining an actual engine torque value of the prime mover; calculating the CVT ratio set point as a function of both the actual RPM value and the actual engine torque value; and controlling the CVT to reach the calculated CVT ratio set point.

2. A method for controlling the ratio set point of a CVT as recited in clause 1, including averaging the actual engine torque value and using the averaged actual engine torque value in the CVT ratio set point calculation.

3. A method for controlling the ratio set point of a CVT as recited in any of the preceding clauses, including averaging the actual RPM value and using the averaged actual RPM value in the CVT ratio set point calculation.

4. A method for controlling the ratio set point of a CVT as recited in any of the preceding clauses, wherein the calculation of the CVT ratio set point is such that, with respect to the actual RPM value of the prime mover, the calculated ratio set point a) is located onto a first curve if the actual engine torque is below a predetermined low actual engine torque threshold, b) is located on a second curve if the actual engine torque is above a predetermined high actual engine torque threshold and c) is located between the first and second curve should the actual engine torque be between the low actual engine torque value and the high actual engine torque value.

5. A method for controlling the ratio set point of a CVT as recited in clause 4, wherein for any given RPM of the prime mover the first curve provides a lower ratio than the second curve.

6. A method for controlling the ratio set point of a CVT as recited in any of clauses clause 1 to 3, wherein the calculation of the CVT ratio set point is such that, with respect to the actual RPM value of the prime mover, the calculated ratio set point a) is located on a first curve should the actual engine torque be below a predetermined low actual engine torque threshold value, b) is located on a second curve should the actual engine torque be at a predetermined medium actual engine torque threshold value, c) is located between the first and the second curves should the actual engine torque be between the low actual engine torque threshold value and the medium actual engine torque threshold value, d) is located on a third curve should the actual engine torque be above a predetermined high actual engine torque threshold value, and e) is located between the second and the third curves should the actual engine torque be between the medium actual engine torque threshold value and the high actual engine torque threshold value.

7. A method for controlling the ratio set point of a CVT as recited in clause 6, wherein for any given RPM of the prime mover a) the first curve provides a lower ratio than either the second and third curves and b) the second curve provides a lower or equal ratio than the third curve.

8. A method for controlling the ratio set point of a CVT as recited in any of the preceding clauses, wherein the CVT controlling step includes calculating a ratio changing rate as a function of the actual engine torque and controlling the CVT to reach the calculated CVT ratio set point at the ratio changing rate calculated.

9. A method for controlling the ratio set point of a CVT as recited in clause 8, including averaging the actual engine torque value and using the averaged actual engine torque value in the ratio changing rate calculation.

10. A method for controlling the ratio set point of a CVT as recited in any of clauses 1 to 7, wherein the CVT controlling step includes a) calculating a first ratio changing rate as a function of the actual engine torque, b) calculating a second ratio changing rate as a function of an actual ground speed and c) controlling the CVT to reach the calculated CVT ratio set point at a ratio changing rate equal to the greater of the first and second ratio changing rates calculated.

11. A method for controlling the ratio set point of a CVT as recited in clause 10, wherein a) the first ratio changing rate is zero when the direction of change of the CVT ratio set point is towards the overdrive and generally increases when the direction of change of the CVT ratio set point is towards the underdrive; and b) the second ratio changing rate generally decreases when the actual ground speed increases.

12. A method for controlling the ratio set point of a CVT as recited in any of clauses 1 to 7, wherein the CVT controlling step includes a) calculating a multiplying factor as a function of the actual engine torque, b) calculating a ratio changing rate as a function of an actual ground speed and c) controlling the CVT to reach the calculated CVT ratio set point at a ratio changing rate equal to the multiplication of the multiplying factor and the ratio changing rate calculated.

13. A method for controlling the ratio set point of a CVT as recited in clause 12, wherein the multiplication factor calculation takes into account a direction of change of the CVT ratio set point.

14. A method for controlling the ratio set point of a CVT as recited in clause 12, wherein the ratio changing rate generally decreases when the actual ground speed increases.

15. A drivetrain including a prime mover provided with an output shaft, a CVT and a controller connected to the prime mover and to the CVT; the CVT including an input shaft connected to the output shaft of the prime mover and an output shaft connected to wheels of a vehicle; the controller being so configured as to receive RPM data and actual engine torque data from the prime mover; the controller being so configured as to calculate a CVT ratio set point using the received RPM data and actual engine torque data and to control the CVT so that the calculated CVT ratio set point is reached.

16. A drivetrain as recited in clause 15, wherein the controller is so configured as to average the received actual engine torque data and using the averaged actual engine torque value in the CVT ratio set point calculation.

17. A drivetrain as recited in any of clauses 15 to 16, wherein the controller is so configured as to average the received actual RPM data and using the averaged actual RPM value in the CVT ratio set point calculation.

18. A drivetrain as recited in any of clauses 15 to 17, wherein the controller is so configured that, with respect to the received actual RPM data, the calculated ratio set point a) is located onto a first curve if the actual engine torque is below a predetermined low actual engine torque threshold, b) is located on a second curve if the actual engine torque is above a predetermined high actual engine torque threshold and c) is located between the first and second curve should the actual engine torque be between the low actual engine torque value and the high actual engine torque value.

19. A drivetrain as recited in clause 18, wherein for any given RPM of the prime mover the first curve provides a lower ratio than the second curve.

20. A drivetrain as recited in any of clause 15 to 17, wherein the controller is so configured that, with respect to the received actual RPM data, the calculated ratio set point a) is located on a first curve should the actual engine torque be below a predetermined low actual engine torque threshold value, b) is located on a second curve should the actual engine torque be at a predetermined medium actual engine torque threshold value, c) is located between the first and the second curves should the actual engine torque be between the low actual engine torque threshold value and the medium actual engine torque threshold value, d) is located on a third curve should the actual engine torque be above a predetermined high actual engine torque threshold value, and e) is located between the second and the third curves should the actual engine torque be between the medium actual engine torque threshold value and the high actual engine torque threshold value.

21. A drivetrain as recited in clause 20, wherein for any given RPM of the prime mover a) the first curve provides a lower ratio than either the second and third curves and b) the second curve provides a lower or equal ratio than the third curve.

22. A drivetrain as recited in any of clauses 15 to 21, wherein the controller is so configured as to calculate a ratio changing rate as a function of the actual engine torque and wherein the control the CVT so that the calculated CVT ratio set point is reached is done at the ratio changing rate calculated.

23. A drivetrain as recited in any of clauses 15 to 21, wherein the controller is so configured as to a) calculate a first ratio changing rate as a function of the actual engine torque, b) calculate a second ratio changing rate as a function of an actual ground speed and c) control the CVT to reach the calculated CVT ratio set point at a ratio changing rate equal to the greater of the first and second ratio changing rates calculated.

24. A drivetrain as recited in clause 23, wherein a) the first ratio changing rate is zero when the direction of change of the CVT ratio set point is towards the overdrive and generally increases when the direction of change of the CVT ratio set point is towards the underdrive; and b) the second ratio changing rate generally decreases when the actual ground speed increases.

25. A drivetrain as recited in any of clauses 15 to 21, wherein the controller is so configured as to a) calculate a multiplying factor as a function of the actual engine torque, b) calculate a ratio changing rate as a function of an actual ground speed and c) control the CVT to reach the calculated CVT ratio set point at a ratio changing rate equal to the multiplication of the multiplying factor and the ratio changing rate calculated.

26. A drivetrain as recited in clause 25, wherein the multiplication factor calculation takes into account a direction of the change of the CVT ratio set point.

27. A drivetrain as recited in any of clauses 25 and 26, wherein the ratio changing rate generally decreases when the actual ground speed increases.

28. A drivetrain as recited in any of clauses 15 to 27, wherein the prime mover is an ICE.

What is claimed is:

1. A method for controlling the ratio set point of a Continuously Variable Transmission (CVT) having an input connected to a prime mover and an output; the method comprising:
   obtaining an actual RPM (Revolution Per Minute) value of the prime mover;
   obtaining an actual engine torque value of the prime mover;
   calculating the CVT ratio set point as a function of both the actual RPM value and the actual engine torque value; and
   controlling the CVT to reach the calculated CVT ratio set point.

2. A method for controlling the ratio set point of a CVT as recited in claim 1, including averaging the actual engine torque value and using the averaged actual engine torque value in the CVT ratio set point calculation.

3. A method for controlling the ratio set point of a CVT as recited in claim 1, including averaging the actual RPM value and using the averaged actual RPM value in the CVT ratio set point calculation.

4. A method for controlling the ratio set point of a CVT as recited in claim 1, wherein the calculation of the CVT ratio set point is such that, with respect to the actual RPM value of the prime mover, the calculated ratio set point a) follows a first curve if the actual engine torque is below a predetermined low actual engine torque threshold, b) follows a second curve if the actual engine torque is above a predetermined high actual engine torque threshold and c) is located between the first and second curve should the actual engine torque be between the low actual engine torque value and the high actual engine torque value.

5. A method for controlling the ratio set point of a CVT as recited in claim 4, wherein for any given RPM of the prime mover the first curve provides a lower ratio than the second curve.

6. A method for controlling the ratio set point of a CVT as recited in claim 1, wherein the calculation of the CVT ratio set point is such that, with respect to the actual RPM value of the prime mover, the calculated ratio set point a) is located on a first curve should the actual engine torque be below a predetermined low actual engine torque threshold value, b) follows a second curve should the actual engine torque be at a predetermined medium actual engine torque threshold value, c) is located between the first and the second curves should the actual engine torque be between the low actual engine torque threshold value and the medium actual engine torque threshold value, d) follows a third curve should the actual engine torque be above a predetermined high actual engine torque threshold value, and e) is located between the second and the third curves should the actual engine torque be between the medium actual engine torque threshold value and the high actual engine torque threshold value.

7. A method for controlling the ratio set point of a CVT as recited in claim 6, wherein for any given RPM of the prime mover a) the first curve provides a lower ratio than either the second and third curves and b) the second curve provides a lower or equal ratio than the third curve.

8. A method for controlling the ratio set point of a CVT as recited in claim 1, wherein the CVT controlling step includes calculating a ratio changing rate as a function of the actual engine torque and controlling the CVT to reach the calculated CVT ratio set point at the ratio changing rate calculated.

9. A method for controlling the ratio set point of a CVT as recited in claim 8, including averaging the actual engine torque value and using the averaged actual engine torque value in the ratio changing rate calculation.

10. A method for controlling the ratio set point of a CVT as recited in claim 1, wherein the CVT controlling step includes a) calculating a first ratio changing rate as a function of the actual engine torque, b) calculating a second ratio changing rate as a function of an actual ground speed and c) controlling the CVT to reach the calculated CVT ratio set point at a ratio changing rate equal to the greater of the first and second ratio changing rates calculated.

11. A method for controlling the ratio set point of a CVT as recited in claim 10, wherein a) the first ratio changing rate is zero when the direction of change of the CVT ratio set point is towards the overdrive and increases when the direction of change of the CVT ratio set point is towards the underdrive; and b) the second ratio changing rate decreases when the actual ground speed increases.

12. A method for controlling the ratio set point of a CVT as recited in claim 1, wherein the CVT controlling step includes a) calculating a multiplying factor as a function of the actual engine torque, b) calculating a ratio changing rate as a function of an actual ground speed and c) controlling the CVT to reach the calculated CVT ratio set point at a ratio changing rate equal to the multiplication of the multiplying factor and the ratio changing rate calculated.

13. A method for controlling the ratio set point of a CVT as recited in claim 12, wherein the multiplying factor calculation takes into account a direction of change of the CVT ratio set point.

14. A method for controlling the ratio set point of a CVT as recited in claim 12, wherein the ratio changing rate decreases when the actual ground speed increases.

15. A drivetrain including a prime mover provided with an output shaft, a CVT and a controller connected to the prime mover and to the CVT; the CVT including an input shaft connected to the output shaft of the prime mover and an output shaft connected to wheels of a vehicle; the controller being so configured as to receive RPM data and actual engine torque data from the prime mover; the controller being so configured as to calculate a CVT ratio set point using the received RPM data and actual engine torque data and to control the CVT so that the calculated CVT ratio set point is reached.

16. A drivetrain as recited in claim 15, wherein the controller is so configured as to average the received actual engine torque data and using the averaged actual engine torque value in the CVT ratio set point calculation.

17. A drivetrain as recited in claim 15, wherein the controller is so configured as to average the received actual RPM data and using the averaged actual RPM value in the CVT ratio set point calculation.

18. A drivetrain as recited in claim 15, wherein the controller is provided with a first curve of the CVT ratio set point with respect to the prime mover RPM and a second curve of the CVT ratio set point with respect to the prime mover RPM; the controller is so configured that, with respect to the received actual RPM data, the calculated ratio set point a) is located onto the first curve if the actual engine torque is below a predetermined low actual engine torque threshold, b) is located on the second curve if the actual engine torque is above a predetermined high actual engine torque threshold and c) is located between the first and second curves should the actual engine torque be between the low actual engine torque value and the high actual engine torque value.

19. A drivetrain as recited in claim 18, wherein for any given RPM of the prime mover the first curve provides a lower ratio than the second curve.

20. A drivetrain as recited in claim 15, wherein the controller is provided with a first curve of the CVT ratio set point with respect to the prime mover RPM, a second curve of the CVT ratio set point with respect to the prime mover RPM and a third curve of the CVT ratio set point with respect to the prime mover RPM; the controller is so configured that, with respect to the received actual RPM data, the calculated ratio set point a) is located on the first curve should the actual engine torque be below a predetermined low actual engine torque threshold value, b) is located on the second curve should the actual engine torque be at a predetermined medium actual engine torque threshold value, c) is located between the first and the second curves should the actual engine torque be between the low actual engine torque threshold value and the medium actual engine torque threshold value, d) is located on the third curve should the actual engine torque be above a predetermined high actual engine torque threshold value, and e) is located between the second and the third curves should the actual engine torque be between the medium actual engine torque threshold value and the high actual engine torque threshold value.

21. A drivetrain as recited in claim 20, wherein for any given RPM of the prime mover a) the first curve provides a lower ratio than either the second and third curves and b) the second curve provides a lower or equal ratio than the third curve.

22. A drivetrain as recited in claim 15, wherein the controller is so configured as to calculate a ratio changing rate as a function of the actual engine torque and wherein the control the CVT so that the calculated CVT ratio set point is reached is done at the ratio changing rate calculated.

23. A drivetrain as recited in claim 15, wherein the controller is so configured as to a) calculate a first ratio changing rate as a function of the actual engine torque, b) calculate a second ratio changing rate as a function of an actual ground speed and c) control the CVT to reach the calculated CVT ratio set point at a ratio changing rate equal to the greater of the first and second ratio changing rates calculated.

24. A drivetrain as recited in claim 23, wherein a) the first ratio changing rate is zero when the direction of change of the CVT ratio set point is towards the overdrive and increases when the direction of change of the CVT ratio set point is towards the underdrive; and b) the second ratio changing rate decreases when the actual ground speed increases.

25. A drivetrain as recited in claim 15, wherein the controller is so configured as to a) calculate a multiplying factor as a function of the actual engine torque, b) calculate a ratio changing rate as a function of an actual ground speed and c) control the CVT to reach the calculated CVT ratio set point at a ratio changing rate equal to the multiplication of the multiplying factor and the ratio changing rate calculated.

26. A drivetrain as recited in claim 25, wherein the multiplying factor calculation takes into account a direction of the change of the CVT ratio set point.

27. A drivetrain as recited in claim 25, wherein the ratio changing rate decreases when the actual ground speed increases.

28. A drivetrain as recited in claim 15, wherein the prime mover is an internal combustion engine.

\* \* \* \* \*